(No Model.)
I. JACKSON.
BELT FASTENER.
No. 465,995. Patented Dec. 29, 1891.
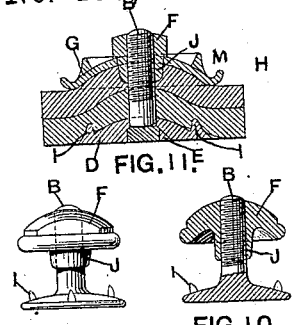
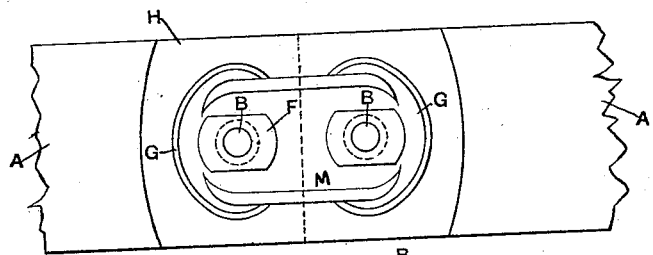
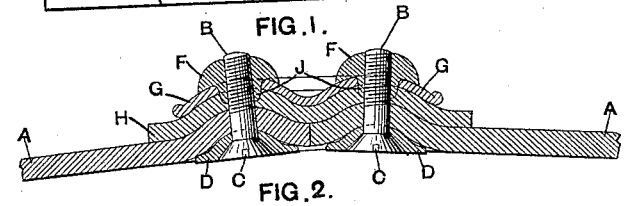
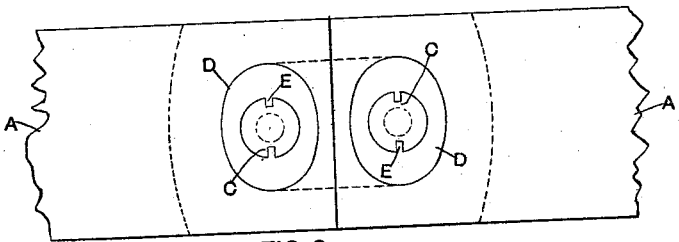
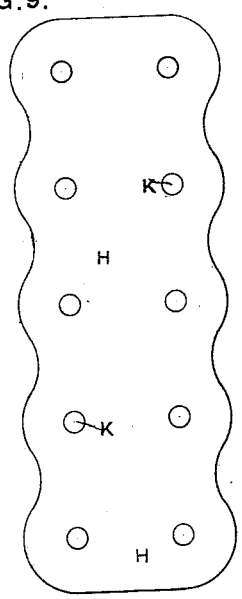
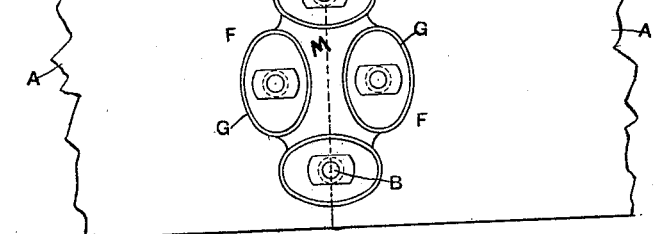
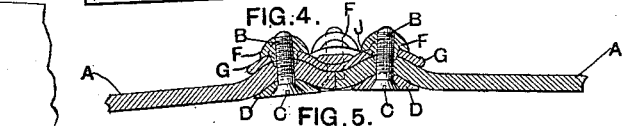
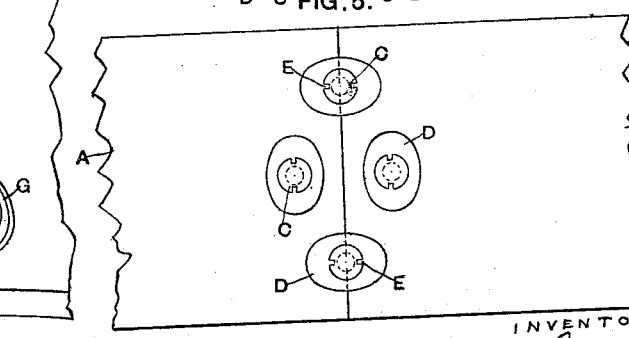
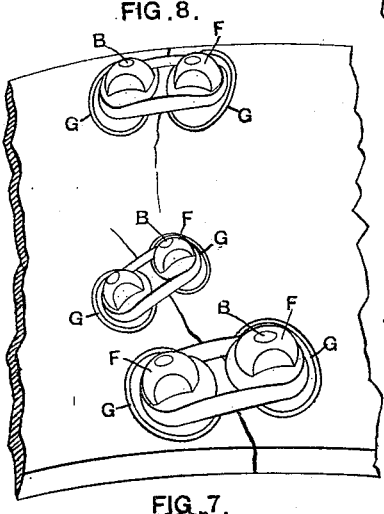
WITNESSES
INVENTOR
Isaac Jackson
By Geo. F. Whittelsey
atty.

UNITED STATES PATENT OFFICE.

ISAAC JACKSON, OF GLOSSOP, ENGLAND.

BELT-FASTENER.

SPECIFICATION forming part of Letters Patent No. 465,995, dated December 29, 1891.

Application filed February 26, 1891. Serial No. 382,980. (No model.) Patented in England December 11, 1889, No. 19,913, and December 9, 1890, No. 20,050.

*To all whom it may concern:*

Be it known that I, ISAAC JACKSON, a citizen of the United Kingdom of Great Britain and Ireland, and a resident of Glossop, in the county of Derby, England, have invented certain new and useful Improvements in Belt-Fasteners, (the said invention having been patented in Great Britain on December 11, 1889, No. 19,913, and on December 9, 1890, No. 20,050,) of which the following is a specification.

This invention relates to belt-fasteners in which the belt or the layers of belt are cupped or drawn out of the level between the outer and the inner parts of the fastener.

My invention is illustrated in the accompanying drawings, in which—

Figure 1 represents a plan, Fig. 2 a longitudinal section, and Fig. 3 an inverted plan, of a fastener having only two cupped parts. Figs. 4, 5, and 6 are similar views of a fastener having four cupped parts. Fig. 7 is a perspective view showing the application of the fasteners for repairing a torn belt. Fig. 8 is a plan of the safe H. Figs. 9 and 10 are respectively an elevation and vertical section of a screw and nut. Fig. 11 is a transverse section through one of the screws of the fastener shown in Fig. 1.

According to my present improvements I form the upper or outer part M of the fastener with two, four, or more cupped parts G, through each of which a screw B is passed from the under side of the belt.

The screw B of the fastener is formed with a plane outer surface and with a coned, domed, or similar inner surface and with two nicks C C at opposite edges of the head. The washer D, when one is used, is cupped, as at G, to correspond with the head of the bolt, and in the recess in which the head of the bolt fits there are formed two nibs E E, constructed to fit in and engage with the nicks formed in the screw-head. It is also provided with two or more fangs or teeth I I on its inner side to engage with the substance of the belt. When this washer is not used, the fangs or teeth are formed on the inner face of the head of the screw and the nicks are omitted, as shown in Figs. 9 and 10, the head being suitably enlarged to give the extended bearing-surface. The nut F has a tubular part J on its inner side, so as to give a greater length of engagement with the threads of the screw, and this tubular part of the nut passes through the upper part of the fastener, the enlarged part of the nut being outside the cupped upper plate and shaped to be fitted by a key or spanner.

In connecting the belt the two ends A A are brought together to form a butt-joint, and they are preferably covered under the fastener with a safe or cover piece of belting or other suitable material, as H, having holes K K formed through it for the passage of the screws.

With these improved fasteners the belts are connected end to end or with a butt-joint, as shown in the drawings, and a cover piece or safe H may or may not be used. I prefer, however, in all cases to use a safe which may be formed from a short piece of belt from india-rubber insertion, leather, or textile material. Such a safe is illustrated by Fig. 8, which represents one which may be used with fasteners, having in the aggregate five screws on each side of the joint. In Figs. 1, 2, 3, and 11 a safe is also represented as in use, but with one screw only on each side of the joint. It will be obvious that the number of screws and the character of the fasteners will in each case be determined by the width and thickness of the belt to be joined thereby. It is preferred that the safe shall be perforated for the passage of the screws before they are sent out for use, in which case the safe will form a templet for the formation of the holes in the ends of the belts.

The holes for the screws B having been formed in the ends of the belts, the washers D are placed in the positions they are to occupy, and are pressed upon the belt, so that their fangs I engage with the belt. The screws are next passed through the washer and [the belt and safe and the nicks in their heads engage with the belt. The screws are next passed through the washer and the belt and safe and the nicks C C in their heads engage with the nibs E E in the washers D. As the washers D are prevented from turning by their teeth I engaging with the belt, and as the nicks in the screw-heads engage with the nibs in the washers, it is evident that while they are in position the screws cannot be turned and that the nuts may be screwed up to tighten the fastener without any further precaution being taken to prevent the rotation of the screw with the nut. When all the screws have been placed in the ends of the belt, the upper part M of the fastener is placed over the joint with the ends of the screws projecting through the holes therein.

The screw-holes are formed one in the center of each cupped part G, and the hole is sufficiently large to permit the passage of the tubular part J of the nut F. For the same purpose the holes in the safe, or where the safe is not used the holes in the end of the belt, are also generally enlarged, at least in their upper parts.

The upper part of the fastener having been placed over the screw ends upon the joint, the nuts are placed thereon and tightened, by which action the substance of the belt, or of the belt and the safe, is forced up by the heads of the screws into the cupped parts of the upper part G, as shown by Figs. 2, 5, and 11. By this means the tensile strain is borne not by the screws or fastener alone, but principally by the material of the belt itself.

In case of a fracture by accidental means of the upper part M of the fastener the safe will continue to effectually connect the two ends of the belt, and it is for this reason that it is preferred to be used.

The nuts are formed, as represented in the drawings, with two flats on their sides to enable them to be engaged by a spanner or key; otherwise they are rounded or dome-shaped to prevent their catching the hands or clothing of the attendants. The provision of the tubular part below the head of the nut enables one to use a shorter screw and considerably reduces the thickness from front to back of the fastener, which is an object of very considerable importance, as reducing the total projection of the fastener from the normal surface of the belt.

When a four-screw fastener is used, as represented in Figs. 4, 5, and 6, two of the screws are arranged, respectively, on opposite sides of the joints, and two of them pass through the line of the joint. To enable a better grip on the ends of the belt to be obtained by the parts of the fastener over the joint-line, it is preferred to form the washers and the cupped upper parts of the fastener oval in plan, as shown in the figures, and because it is inconvenient in practice to have different shapes of fasteners in the same size I prefer to form all the washers and all the cupped parts of the fasteners similarly oval in plan.

In the case of a torn or similarly-injured belt the fasteners may be advantageously used for repairs, as shown by Fig. 8. In such a case it is only necessary to make holes on each side of the fracture and connect the belt as for a joint.

By means of these fasteners short lengths of discarded belts may be conveniently joined together to form a continuously-working belt.

Having now particularly described and ascertained the nature of my said invention and in what manner the same is to be performed, I declare that what I claim is—

1. A belt-fastener comprising a rigid upper plate having two or more separated cupped portions adapted to lie on either side of the joint, two or more convex parts adapted to lie against the opposite side of the belt and provided with teeth to enter the belt two or more screw-threaded shanks, and a nut for each screw, having a tubular part adapted to pass through the upper plate, substantially as described.

2. A belt-fastener comprising an upper plate having two or more cupped parts, two or more cupped washers having teeth or fangs on their inner surfaces and projections on their outer surfaces, two or more screws provided with recesses engaging the projections on the washers, and two or more nuts for the screws, substantially as described.

3. A belt-fastener comprising an upper plate having two or more cupped parts, two or more cupped washers having teeth or fangs on their inner surfaces and projections on their outer surfaces, two or more screws provided with recesses engaging the projections on the washers, and two or more nuts for the screws, each having a lower tubular part, substantially as described.

In testimony that I claim the foregoing as my invention I have signed my name, in presence of two witnesses, this 19th day of December, 1890.

ISAAC JACKSON.

Witnesses:
  WM. E. HEYS,
  GEO. W. ROWE.